July 20, 1926.
F. A. BYLES
1,593,386
CIRCUIT CONTROLLER
Filed Oct. 9, 1924
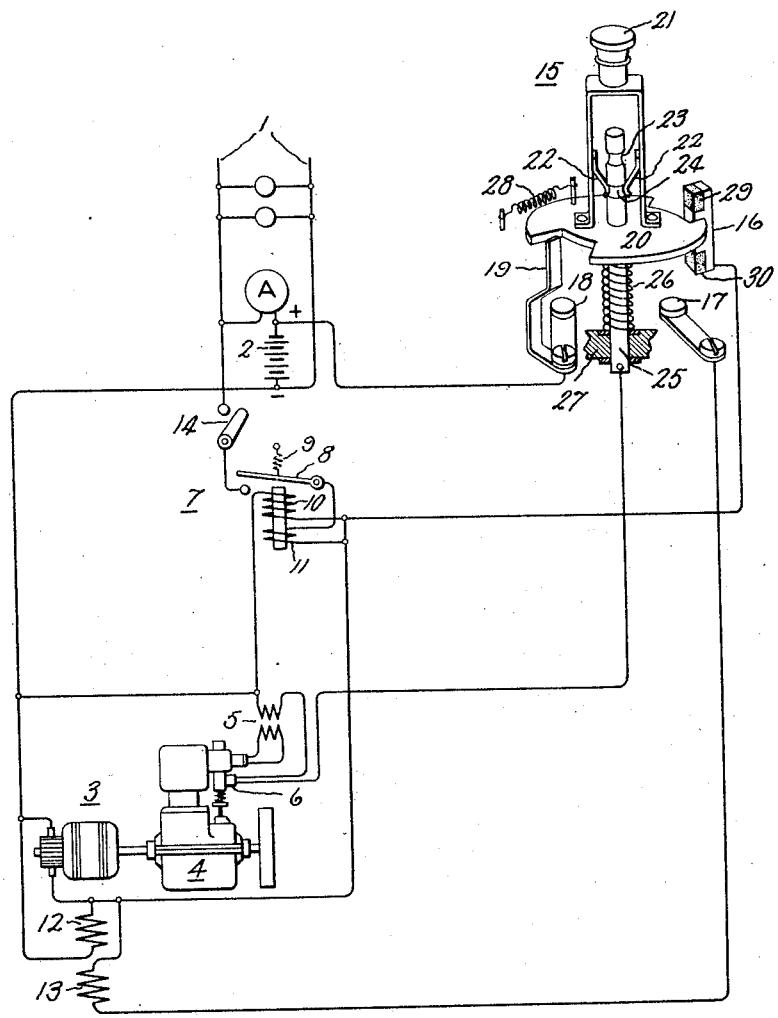
Inventor:
Frank A. Byles,
by Alexander S. Lunt
His Attorney.

Patented July 20, 1926.

1,593,386

UNITED STATES PATENT OFFICE.

FRANK A. BYLES, OF SCHENECTADY, NEW YORK, ASSIGNOR TO GENERAL ELECTRIC COMPANY, A CORPORATION OF NEW YORK.

CIRCUIT CONTROLLER.

Application filed October 9, 1924. Serial No. 742,714.

My invention relates to electric systems wherein a power unit comprising a dynamo-electric machine and an internal combustion engine is adapted to charge a storage battery connected to a load circuit, and wherein the battery is used to operate the machine as a motor to start the engine, and has for its object the provision of an improved circuit controller for controlling the operation of a system of this character.

Various arrangements have been proposed and used for controlling the operation of isolated electric power systems wherein current is supplied to a storage battery from a dynamo-electric machine driven by an internal combustion engine or the like. One such arrangement is disclosed in my United States Letters Patent No. 1,415,309. This arrangement comprises a manually operable switch biased to open position and arranged both to close the engine ignition circuit and to connect the dynamo-electric machine to the battery for operating it as a motor to crank the engine at starting, a relay operable in accordance with the electrical conditions of the system automatically to connect the ignition and battery circuits to the machine independently of the starting switch when the machine voltage has attained a predetermined value, and a manually controlled switch for opening the ignition and battery circuits to stop the charging set.

In accordance with my present invention manual control of the system both at starting and stopping is effected through a single circuit control mechanism which is operable to start and stop the power unit and to rearrange its connections to permit hand-cranking of the engine.

My invention will be better understood from the following description when considered in connection with the accompanying drawing and its scope will be pointed out in the appended claims.

The drawing shows a system wherein my invention has been embodied.

The drawing shows a load circuit 1 arranged to be supplied with current from a storage battery 2 through an ammeter A. A generating unit comprising a dynamo-electric machine 3 and a prime mover 4 is provided for charging the storage battery 2. A transformer 5 is connected in the ignition circuit of the prime mover 4 for stepping up the pulsating voltage produced through operation of the engine timer 6. Automatic control of the ignition and battery circuits is effected through a reverse current relay 7 which comprises a contact member 8 biased to open position by a spring 9, and operating coils 10 and 11 arranged to be connected in shunt and series relation respectively with the main load circuit of the dynamo-electric machine 3. The machine 3 is provided with a shunt field coil 12 and with a field coil 13 arranged to be connected in series with the machine to ensure sufficient torque at starting. A switch 14 is provided for manually opening the load circuit of the machine 3 when it is desired to utilize the engine 4 for operating load devices other than the machine to which it is coupled.

Manual control of the battery and engine ignition circuits is effected by means of a switch 15 which comprises contact members 16, 17, 18 and 19 arranged to cooperate with a contact disk 20. The contact disk 20 is provided with a handle 21 to which are attached resilient members 22 arranged to engage grooves 23 and 24 in a conductive support member 25 upon which the contact disk is mounted. For the purpose of biasing the disk 20 to a position in which the springs 22 engage the slot 24, a spring 26 is interposed between the insulating base 27 of the support member 25 and the disk 20. The disk 20 is provided with peripheral recesses adapted to receive the contact members 16 and 19 and is biased into engagement with the contact member 16 by means of a spring 28. It will be observed that the contact member 16 at its upper and lower ends is provided with isnulation segments 29 and 30 respectively.

The switch 15 is operable to four different positions. When this switch is in its upper or off position, the spring clips 22 are seated in the groove 23, the contact disk 20 is in engagement with the insulation segment 29 and the ignition and battery circuits are open. If it is desired to start the engine 4 by hand-cranking, the disk 20 is moved to a position in which the spring clips engage the groove 24 and at the same time is turned in a clockwise direction to bring the disk 20 into engagement with the contact member 19 for the purpose of connecting the engine ignition circuit to the battery 2. As the engine is accelerated, the voltage of the generator increases in value until the relay 7 is closed by the voltage coil 10 and the current coil 11 is connected to the generator 3 in series with the battery 2. The relay 7 may be opened by moving the switch 15 to its off position, thus interrupting the engine ignition circuit and decelerating the generator. If at any time the engine should stop, the relay 7 immediately opens due to the fact that current is supplied in a reverse direction from the battery to the generator.

If it is desired to crank the engine by driving the machine 3 as a motor, the contact disk 20 is pushed into engagement with the contact members 17 and 18, thus connecting the engine ignition circuit to the battery and at the same time connecting the machine 3 to the battery in series with its field winding 13 which is designed to ensure sufficient torque for starting the engine. When the machine 3 is accelerated to normal speed, its voltage is high enough to produce closure of the relay 7 and the handle 21 may be released to permit movement of the contact disk into engagement with the contact 16 through which the ignition circuit of the engine is connected across the generator terminals. It will be observed that the switch 15 is capable of performing a multiplicity of functions and affords a simple and reliable means of starting the battery charging set either by hand-cranking when the disk 20 is moved to its running or mid-position and turned to the right or by operating the generator as a motor to crank the engine when the disk 20 is moved into its lower or starting position. The switch 15 is furthermore operable to maintain the engine ignition circuit closed when the disk 20 is in its running position and when moved to its upper or off position serves to interrupt the engine ignition circuit, thus bringing the charging set to rest and causing the connection between the generator and battery to be interrupted by the relay.

What I claim as new and desire to secure by Letters Patent of the United States, is:—

1. An electric switch comprising a conductive support member, a contact member movable along said support member to a plurality of positions and revolvable about said support member to another position, a contact member having insulating segments arranged to engage said movable member in some of said first mentioned positions and having a conductive segment arranged to engage said movable member in another of said first mentioned positions, a second contact member, a pair of interconnected contacts one of which is arranged to engage said movable member in said second mentioned position and the other of which is arranged to be connected with said second contact member by said movable member in one of said first mentioned positions.

2. An electric switch comprising a conductive support member, a contact member movable along said support member to starting and running and off positions and revolvable about said support member to a second starting position, a contact member having insulating segments arranged to engage said movable contact member in its off and first mentioned starting positions and having a conductive segment arranged to engage said movable member in its running position, and a pair of interconnected contact members one of which is arranged to engage said movable member in its first mentioned starting position and the other of which is arranged to engage said movable member in its second mentioned starting position.

3. An electric switch comprising a conductive support member, a contact member movable along said support member to a plurality of positions and revolvable about said member to another position, a contact member having insulating segments arranged to engage said movable member in some of said first mentioned positions and having a conductive segment arranged to engage said movable member in another of said first mentioned positions, a pair of interconnected contacts one of which is arranged to engage said movable contact in said second mentioned position and the other of which is arranged to engage said movable contact in one of said first mentioned positions, and means for biasing said movable contact member to a position in which it engages said conductive segment.

In witness whereof, I have hereunto set my hand this 8th day of October, 1924.

FRANK A. BYLES.